United States Patent
Wong et al.

(10) Patent No.: US 11,029,589 B2
(45) Date of Patent: Jun. 8, 2021

(54) LASER LIGHT SOURCE OPTICAL PROJECTION ARCHITECTURE

(71) Applicant: Syndiant Inc., Dallas, TX (US)

(72) Inventors: Chun Chiu Daniel Wong, Palo Alto, CA (US); Sheng Hsiung Chan, Zhubei (TW)

(73) Assignees: SYNDIANT INC., Dallas, TX (US); XDMICRO (ZHONGSHAN) OPTOELECTRONIC SEMICONDUCTOR CO., LTD., Zhongshan (CN)

( * ) Notice: Subject to any disclaimer, the term of this patent is extended or adjusted under 35 U.S.C. 154(b) by 0 days.

(21) Appl. No.: 16/713,126

(22) Filed: Dec. 13, 2019

(65) Prior Publication Data
US 2021/0063860 A1    Mar. 4, 2021

(30) Foreign Application Priority Data
Sep. 3, 2019   (TW) ................................. 108131721

(51) Int. Cl.
    G03B 21/20     (2006.01)
    H04N 9/31      (2006.01)
    H04N 5/74      (2006.01)

(52) U.S. Cl.
    CPC ....... *G03B 21/2033* (2013.01); *H04N 9/3114* (2013.01); *H04N 9/3117* (2013.01); *H04N 5/7416* (2013.01)

(58) Field of Classification Search
    CPC .............. G03B 21/2066; G03B 21/204; G03B 21/2033; H04N 9/3161; H04N 9/3114
    See application file for complete search history.

(56) References Cited

U.S. PATENT DOCUMENTS

| 9,880,454 | B2* | 1/2018 | Takahashi | ................ F21V 9/45 |
| 2014/0071408 | A1* | 3/2014 | Takahashi | ............ G02B 27/141 353/31 |
| 2016/0091785 | A1* | 3/2016 | Inoko | ....................... G02B 5/10 353/31 |

* cited by examiner

*Primary Examiner* — Ryan D Howard
(74) *Attorney, Agent, or Firm* — McClure, Qualey & Rodack, LLP

(57) ABSTRACT

The present invention relates to a laser light source optical projection architecture, which comprises a laser light source group, a color control device, a phosphor device and an optical filter group. Accordingly, the laser light source optical projection architecture does not require to synchronize the phosphor device with the color field sequential display system, and the color control (ratios of the color duty) does not need to be determined in advance, i.e. at the time the color control device is manufactured. Various color field ratios can be achieved by adjusting positions of the specific color control device to obtain different red, blue and green color field durations, allowing easy electronic control of the color field duty cycles.

21 Claims, 4 Drawing Sheets

FIG. 1 [Prior art]

LASER LIGHT SOURCE OPTICAL PROJECTION ARCHITECTURE

CROSS-REFERENCES TO RELATED APPLICATIONS

This application claims priority to Taiwan Patent Application No. 108131721 filed on Sep. 3, 2019.

BACKGROUND OF THE INVENTION

Field of the Invention

The present invention relates to a laser light source optical projection architecture, and particularly, relates to a light source architecture in which a phosphor device does not need to be synchronized with a panel.

Descriptions of the Related Art

The traditional monolithic liquid crystal on silicon (LCOS) optical-illumination technology is divided into two categories due to the difference of system panel technology in the use of light sources: Color Filter type and Field Color Sequential type, with the latter having a higher light use efficiency.

The light source technology of the field color sequential type may be further divided into two types, one with a color wheel and the other with no color wheel. Color wheels may be further divided into two types, namely filter color wheels and phosphor color wheels. A light source module using the filtered color wheel is usually white light or a mixed-color light. A multi-segment, multi-color filter in the filtered color wheel can be used to separate red light, green light, blue light and other light. And then a light source module using the phosphor color wheel can be used as a white light or a mixed-color light, and the multi-segment, multi-color phosphor in the phosphor color wheel can be used to generate red light, green light, blue light and other light. The traditional placement position of the multi-segment phosphor color wheel is perpendicular to the optical axis of the optical path, and the segment sizes of the multi-segment phosphor color wheel are fixed and cannot be freely adjusted. In contrast, the light source technology not using the color wheel requires individual red, green and blue light sources to sequentially illuminate a panel. For high brightness applications, this approach has a high cost.

The traditional laser light source optical projection architecture uses a blue laser light source and a multi-segment phosphor color wheel. The blue laser, of course, emits blue light, but can also be used to excite red phosphor to emit red light or excite green phosphor to emit green light. By using a color wheel with red phosphor, green phosphor, and transparent segments, red, green, and blue light can be sequentially generated to illuminate a panel. It is necessary to synchronize the multi-segment phosphor color wheel with the field color sequential LCOS, digital light processing (DLP), or liquid crystal display (LCD) panel. The color field duration is fixed by the size of the phosphor color wheel segments which is determined at the time the wheel is manufactured. Therefore, the color field duration cannot be adjusted on the fly in a system.

Referring to FIG. 1 for the prior art, there is another optical light source architecture applied to laser projection, with a basic architecture comprising of two blue laser light sources, transparent/green phosphor color wheel, and a red phosphor color wheel. The two blue laser light sources 11 and 12 provide two blue light beams 1B and 2B, where light beam 1B passes through an optical filter 18 to strike the transparent/green phosphor color wheel 16. 15B is the light diffusor. Exiting from this color wheel is a blue light beam (passing through the transparent segment of the wheel) or a green light beam (green phosphor segment of the wheel excited by the blue laser). The second blue light beam 2B passes through optical filter 19 to strike a red phosphor color wheel 17, exciting the red phosphor to generate red light beam R. The red light beam R, the green light beam G and the blue light beam 1B sequentially strike the LCOS, DLP, or LCD panel. The transparent/green phosphor color wheel must be synchronized with the panel, and requiring fine tuning of the ratio of transparent to green segments. This is problematic because the proportion of transparent/green is fixed on a conventional color wheel and cannot be adjusted on the fly.

Another laser light source optical projection architecture adopts a dual-color wheel architecture. One of the color wheels is dual-color with yellow phosphor and the other color wheel is a traditional filtered color wheel. This architecture has the same control mode as the traditional color wheel projector in a field color sequential system.

However, the aforementioned architecture requires a relatively complicated control system because the segment sizes and the rotation speed of the multi-segment phosphor color wheel or the dual-segment phosphor color wheel must be accurately set in advance to synchronize with the LCOS, DLP, or LCD panel. Moreover, the color wheel proportions of the segments cannot be adjusted without changing color wheels.

In view of this, it's necessary to provide a light source architecture that can improve the aforementioned drawbacks.

SUMMARY OF THE INVENTION

The present invention provides a laser light source optical projection architecture, which can eliminate the accurate pre-setting requirements of a phosphor device to synchronize with a field color sequential LCOS, DLP, or LCD panel.

In order to achieve the above objective, the present invention provides a laser light source optical projection architecture, which comprises of: a laser light source group, configured to generate light; a color control device, configured either to reflect light by using an aluminum-plated reflective film segment or to allow light to pass through a transparent glass segment, and capable of moving along the 45-degree direction by electronic control or manual operation for freely adjusting time proportions of reflected light to pass through the light; a reflector group, configured to guide light to the optical-illumination system; at least one phosphor device, situated in the light beam path; an optical filter group, situated in the light beam path and only reflecting specific light beam which is defined by the optical filter group and allowing non-specific light to pass through to the optical-illumination system.

DESCRIPTION OF THE PREFERRED EMBODIMENT

First it shall be appreciated what is described below only illustrates possible embodiments of the present invention by way of example, and is not intended to limit the scope claimed by the present invention.

Figure 1:
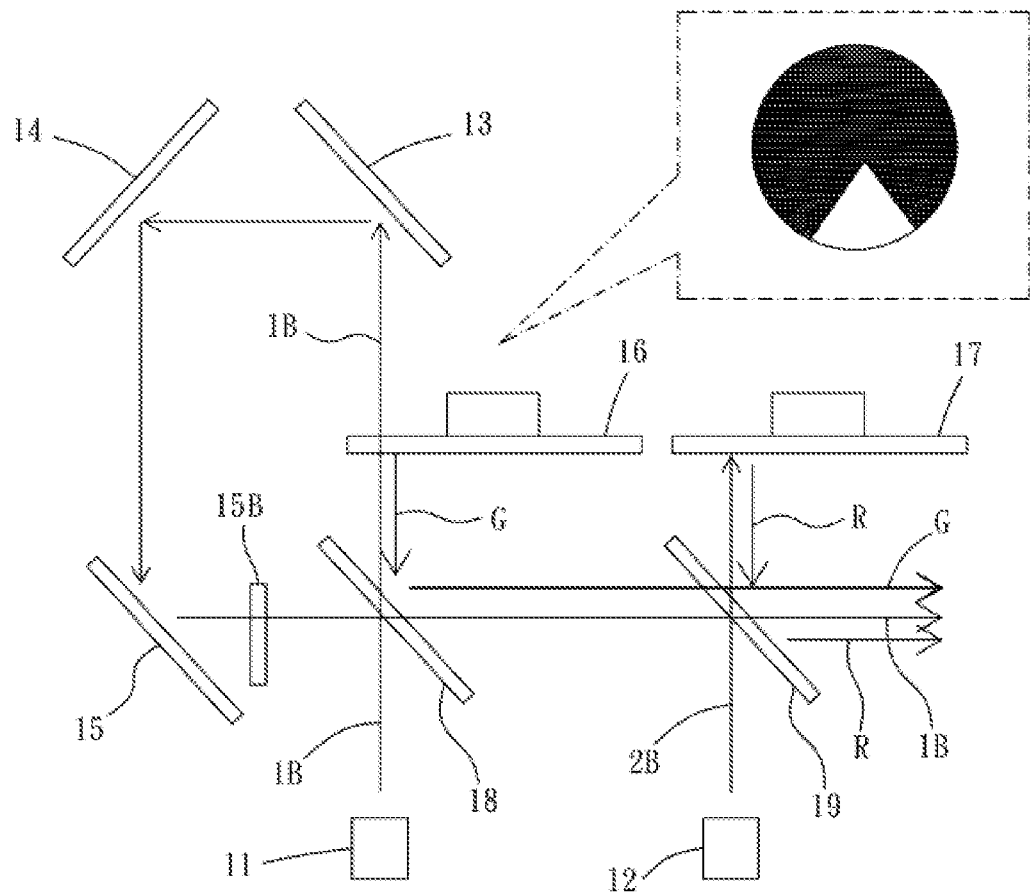
FIG. 1 is a diagram in the prior art that uses an architecture with double phosphor color wheels.
Figure 2:
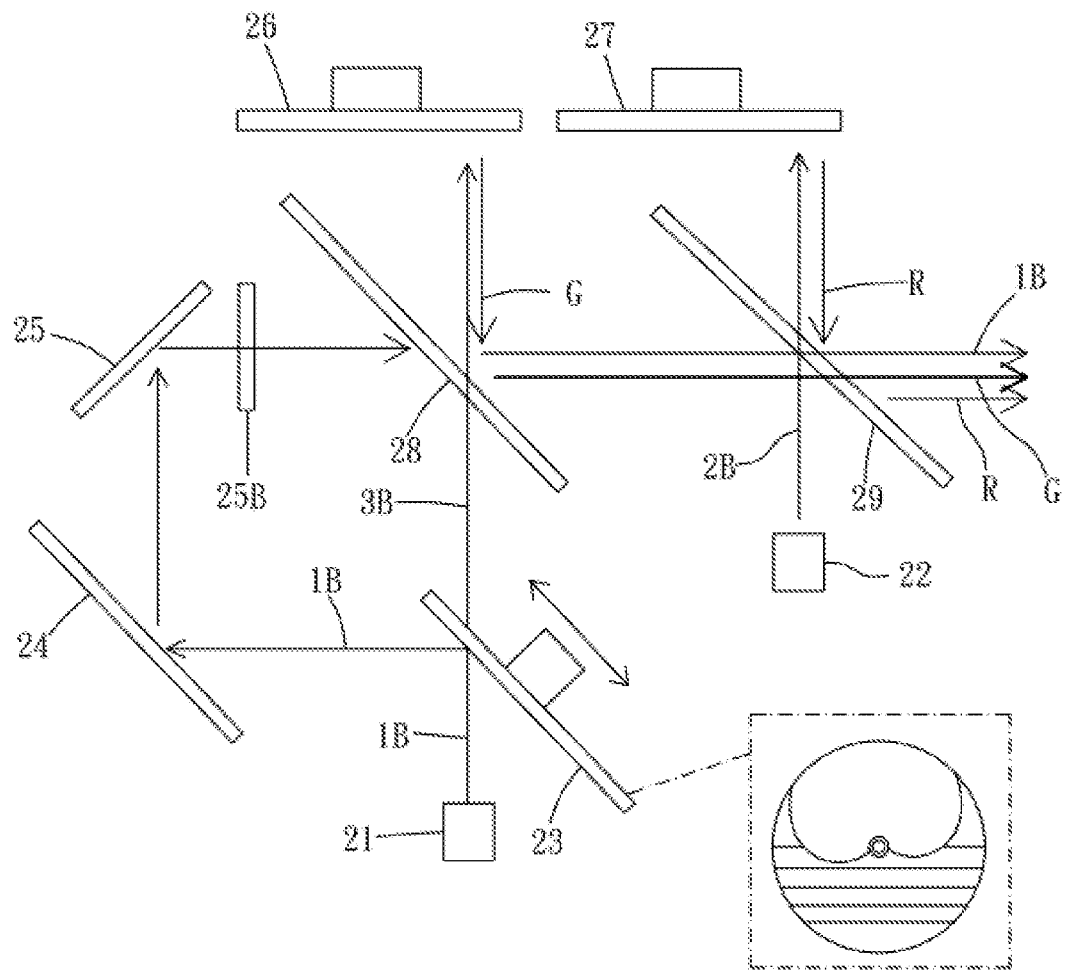
FIG. 2 is a diagram of a first example of the present invention.

Please refer to FIG. 2, which is a diagram of a first embodiment of the present invention. In the first embodiment, a laser light source optical projection architecture may include a first light source 21, a second light source 22, a color control device 23, a first reflector 24, a second reflector 25, a light diffusor 25B, a first phosphor color wheel 26, a second phosphor color wheel 27, a first optical filter 28 and a second optical filter 29.

According to the first embodiment, the red light beam R, green light beam G and blue light beam B are generated by a red phosphor color wheel, a green phosphor color wheel and a blue laser. The output of the blue light beam and the green light beam is controlled by the color control device 23 synchronized with a LCOS, DLP, or LCD panel. The LCOS, DLP, or LCD panel can be used in a single panel or dual-panel architecture. The color control device 23 may be a transparent/reflective wheel with a segment plated with a reflective aluminum film or device 23 may be an actuator having a portion plated with a film.

The first light source 21 is a blue laser light source that generates a blue light beam 1B. When blue light beam 1B propagating upward strikes the segment of the color control device 23 plated with the reflective aluminum film, blue light beam 1B is reflected to the left by the color control device 23, subsequently striking reflector 24, propagating upward striking the second reflector 25, propagating to the right and passing through the first optical filter 28 and the second optical filter 29 and then enters the optical-illumination system.

Alternately, blue light beam 1B propagating upward strikes the transparent glass segment of the color control device 23, blue light beam 1B passes through the color control device 23 to become blue light beam 3B, and blue light beam 3B passes through the first optical filter 28 and strikes the first phosphor color wheel 26, The first phosphor color wheel 26 may be replaced by a phosphor plate. The first phosphor color wheel 26 may be stationary or may rotate in a free-run mode for the purpose of heat dissipation when irradiated by a high-energy laser. Light beam 3B excites the green phosphor of color wheel 26 resulting in a green light beam G propagating downward, reflected to the right by the first optical filter 28, passes through the second optical filter 29 and then enters the optical-illumination system.

The second light source 22 is a blue laser light source that generates a blue light beam 2B. Blue light beam 2B propagating upward passes through the second optical filter 29 to strike the second phosphor color wheel 27, wherein the second phosphor color wheel may be replaced by a phosphor plate. The second phosphor color wheel 27 may be stationary or may rotate in a free-run mode for the purpose of heat dissipation when irradiated by a high-energy laser. Blue light beam 2B excites the red phosphor of color wheel 27 resulting in red light beam R propagating downward, and reflected to the right by the second optical filter 29 and then enters the optical-illumination system.

In this embodiment, the proportion of the reflective aluminum film segment to the transparent segment of the color control device 23 varies from small to large with increasing radius. In this way, the color control device 23 may be moved along the 45-degree direction, relative to light beam 1B, by electrical control or manual operation so that as the blue laser light source 21 moves further from the axis of rotation, the proportion of reflective segment to transparent segment changes. This allows easy control of the blue/green light beam ratio.

Figure 3:
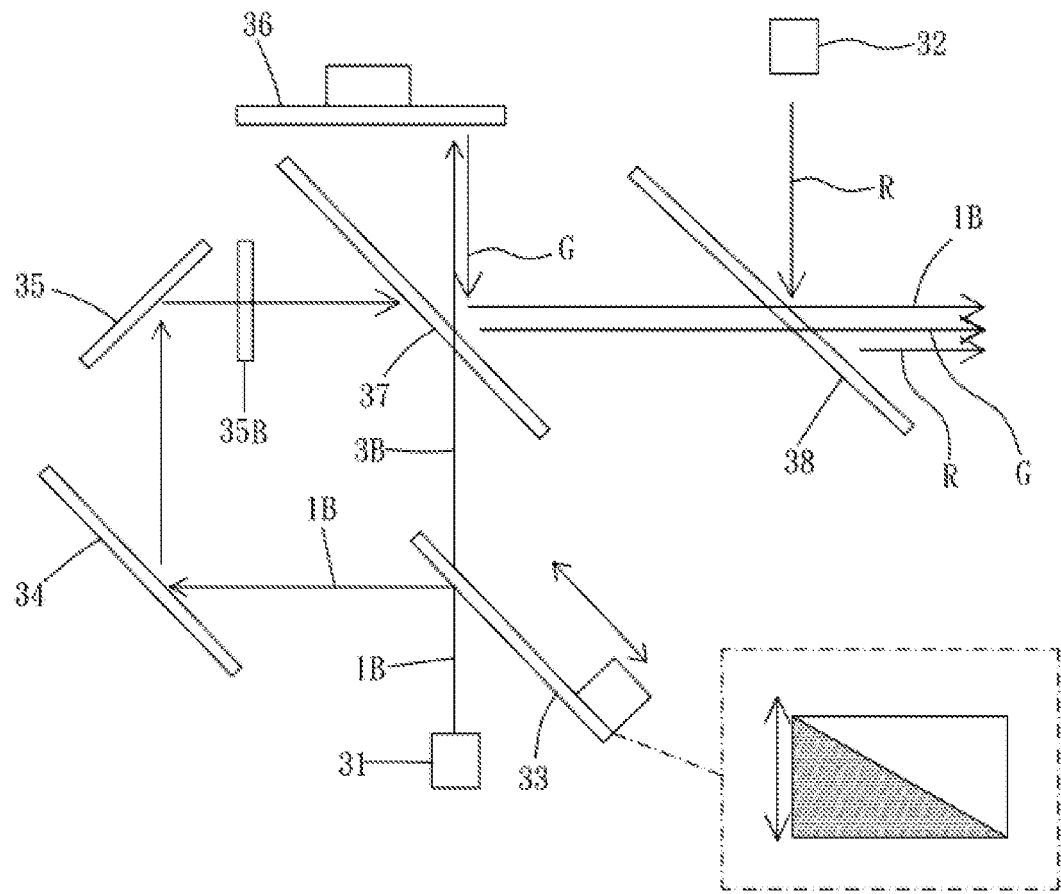
FIG. 3 is a diagram of a second example of the present invention.

Please refer to FIG. 3, which is a diagram of a second embodiment of the present invention. In the second embodiment, the laser light source optical projection architecture may include a first light source 31, a second light source 32, a color control device 33, a first reflector 34, a second reflector 35, a light diffusor 35B, a phosphor color wheel 36, a first optical filter 37 and a second optical filter 38.

According to the second embodiment, the red light beam R, green light beam G and blue light beam B are generated by a red laser, a green phosphor color wheel and a blue laser, wherein the output of the blue light beam and the green light beam is controlled by the color control device 33 synchronized with the LCOS, DLP, or LCD panel. The LCOS, DLP, or LCD panel may be used in a single panel or dual-panel architecture, and the color control device 33 may be a transparent/reflective wheel with a segment plated with a reflective aluminum film or device 33 may be an actuator having a segment plated with a film sheet.

The first light source 31 is a blue laser light source that can generate a blue light beam 1B. When the blue light beam 1B propagating upward strikes of the reflective segment of the color control device 33, the blue light beam 1B is reflected to the left by the color control device 33, wherein the color control device 33 is an actuator having a segment plated with a film sheet (arrows indicate vibration directions, which are directions perpendicular to the page in FIG. 3). After reflection by color control device 33, blue light beam 1B continues propagating to the left strike the first reflector 34, reflected upward to strike the second reflector 35, passes through the first optical filter 37 and the second optical filter 38, and then enters the optical-illumination system.

Alternately, the first blue light beam 1B propagating upward and strikes the transparent segment of the color control device 33, the blue light beam 1B passes through the color control device 33 to become blue light beam 3B, and blue light beam 3B passes through the first optical filter 37 striking the phosphor color wheel 36, wherein the phosphor color wheel 36 may be replaced by a phosphor plate. The phosphor color wheel 36 may be stationary or may rotate in a free-run mode to provide heat dissipation when irradiated by a high-energy. Light beam 3B excites the green phosphor of color wheel 36 generating a downward green light beam G, reflected to the right by the first optical filter 37, and passes through the second optical filter 38 and then enters the optical-illumination system.

The second light source 32 is a red laser light source that can generate a red light beam R. Red light beam R propagating downward strikes the second optical filter 38, and is reflected to the right by the second optical filter 38 and then enters the optical-illumination system.

In this embodiment, the proportion of the reflective segment to the transparent segment of the color control device 33 is designed to vary from small to large at different heights. In this way, the color control device 33 moves along the 45-degree direction by electrical control or manual operation so that the ratio of the transparent segment to reflective segment of device 33 being irradiated changes.

The color control device 33 is synchronized with the LCOS, DLP, or LCD panel by electronic adjustment, thereby achieving the purpose of easy control of the color field duty cycle by adjusting the different time proportions of the blue light beam and the green light beam.

Figure 4:
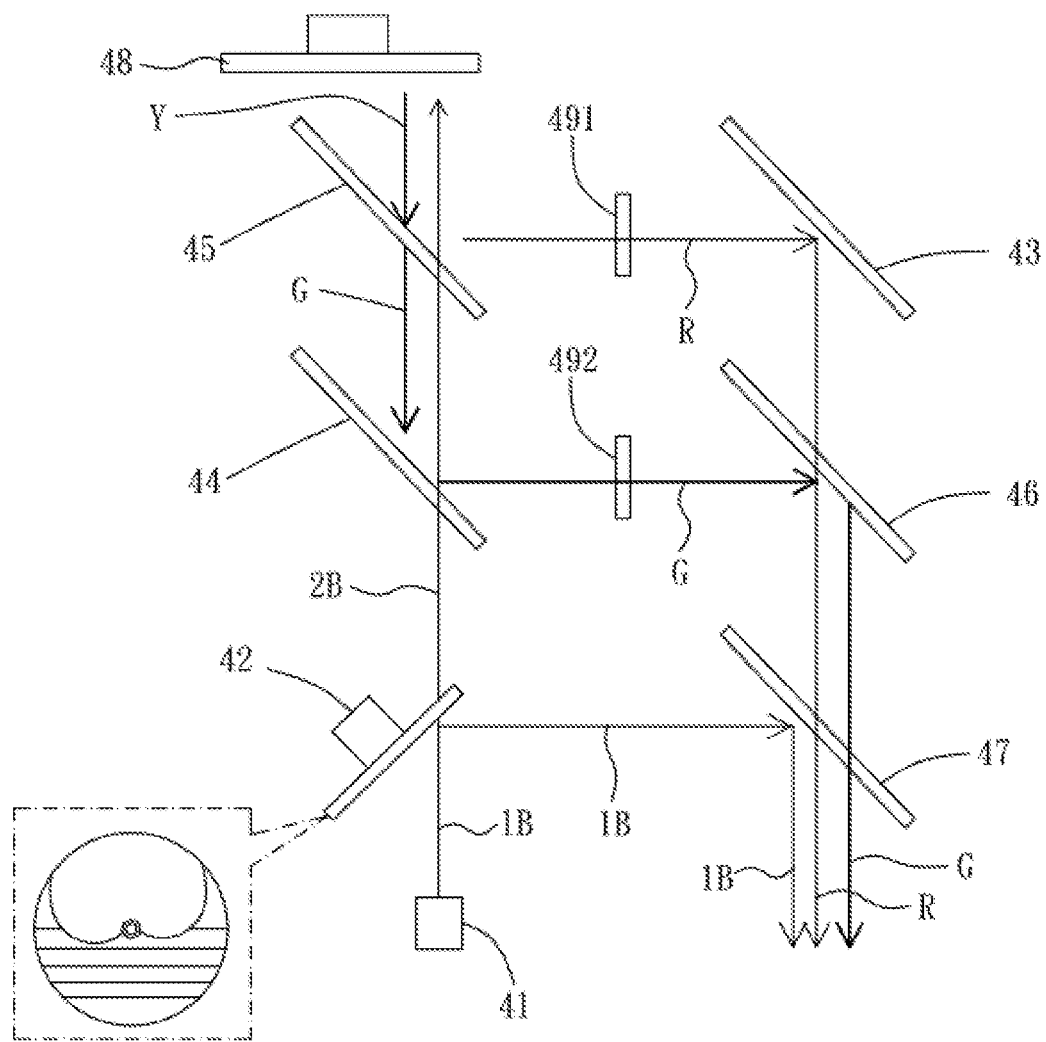
FIG. 4 is a diagram of a third example of the present invention.

Please refer to FIG. 4, which is a diagram of a third embodiment of the present invention. In the third embodiment, the laser light source optical projection architecture may include a blue light source 41, a color control device 42, a reflector 43, a first optical filter 44, a second optical filter 45, a third optical filter 46, a fourth optical filter 47, a phosphor color wheel 48, a first electrically controlled light shutter 491 and a second electrically controlled light shutter 492.

According to the third embodiment, the red light beam R, green light beam G and blue light beam B are generated by a yellow phosphor color wheel and a blue laser into an optical-illumination system, wherein the output of the red light beam, the green light beam and the blue light beam is controlled by the color control device 42 synchronized with the LCOS, DLP, or LCD panel together with the first electrically controlled light shutter 491 and the second electrically controlled light shutter 492. The LCOS, DLP, or LCD panel may be used in a single panel or dual-panel architecture, and the color control device 42 may be a transparent/reflective wheel with a segment plated with a reflective aluminum film or an actuator having a segment plated with a film sheet.

The blue light source 41 generating a blue light beam 1B, is reflected to the right by the reflective segment of the color control device 42, then striking the fourth optical filter 47, which reflects the blue light beam 1B downward into the optical-illumination system.

When the first blue light beam 1B propagating upward strikes the transparent segment of the color control device 42, the blue light beam 1B passes through the color control device 42 to become blue light beam 2B, and passes through the first optical filter 44 and the second optical filter 45 striking the phosphor color wheel 48, wherein the phosphor color wheel 48 may be replaced by a phosphor plate. The phosphor color wheel 48 may be stationary or may rotate in a free-run mode to provide heat dissipation when irradiated by a high-energy laser. Blue light beam 2B excites the yellow phosphor generating a downward yellow light beam Y which is formed by mixing the green light beam G and the red light beam R, wherein the downward green light beam G is reflected to the right by the first optical filter 44 and strikes the third optical filter 46 after passing through the second electrically controlled light shutter 492. The green light beam G is reflected downward by the third optical filter 46 and penetrates the fourth optical filter 47 to enter into the optical-illumination system.

In this embodiment, the proportion of the reflective aluminum film segment to the transparent segment of the color control device 42 is designed to vary from small to large as the radius increases. In this way, the color control device 42 moves along the 45-degree direction by electrical control or manual operation so that as the blue laser light source 41 moves further from the axis of rotation, the proportion of reflective segment to transparent segment changes. The color control device 42, the first electrically controlled light shutter 491 and the second electrically controlled light shutter 492 are synchronized with the LCOS, DLP, or LCD panel by electronic adjustment, wherein the first electrically controlled light shutter 491 and the second electrically controlled light shutter 492 may be electro-optic (EO) or acousto-optic (AO) elements. Thereby, the purpose of easy control of the color field duty cycle is achieved by adjusting the different time proportions of the red light beam, green light beam and blue light beam.

According to the above descriptions, the laser light source optical projection architecture of the present invention utilizes the color control device in place of the multi-segment phosphor color wheel or the double-segment phosphor color wheel for light beam splitting. The phosphor device may be stationary or may rotate in a free-run mode with no requirement for synchronization with the color fields of the display panel—removing the issue of synchronization. Moreover, the color control (color duty) does not need to be set in advance, as is the case for a traditional color wheel system. The color field duration can be easily adjusted in the system, which is not possible with a traditional color wheel where the color field duration is set at the time the color wheel is manufactured. In addition, the color control can be carried out in different time segments of the red light beam, the green light beam and the blue light beam by means of electronic synchronous setting of the color control device, the first electrically controlled light shutter and the second electrically controlled light shutter.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A laser light source optical projection architecture, comprising:
   a laser light source, configured to generate light; and
   a color control device configured as a transparent/reflective wheel with at least one segment plated with a reflective aluminum film, wherein the proportion of the reflective aluminum film segment to the transparent segment of the color control device is designed to vary from small to large with increasing radius, placed in a light path and forming an angle of 45 degrees with an optical axis, configured to split the light into reflected light and pass through light, and capable of moving along the 45-degree direction to adjust the ratio of pass through light to reflected light for color control.

2. The laser light source optical projection architecture of claim 1, comprising an electrically controlled light shutter group, which is capable of color control by adjusting different time proportions of red light, green light and blue light through synchronous adjustment of the color control device and the electrically controlled light shutter group.

3. A laser light source optical projection architecture, comprising:
   a laser light source, configured to generate light; and
   a color control device, configured as an actuator having a special segment thereof plated with a film sheet, wherein the proportion of a reflective aluminum film segment to a transparent segment of the color control device is designed to vary from small to large as the laser light beam traverses the length of the device, the color control device placed in a light path and forming an angle of 45 degrees with an optical axis, configured to split the light into reflected light and pass through light, and capable of moving along the 45-degree direction to adjust the ratio of pass through light to reflected light for color control.

4. The laser light source optical projection architecture of claim 3, comprising an electrically controlled light shutter group, which is capable of color control by adjusting different time proportions of red light, green light and blue light through synchronous adjustment of the color control device and the electrically controlled light shutter group.

5. A laser light source optical projection architecture, comprising:
- a laser light source group, comprising a first laser light source and a second laser light source that are respectively configured to generate a first light beam and a second light beam;
- a color control device, configured as a transparent/reflective wheel with a segment plated with a reflective aluminum film, placed in a first light beam path and forming an angle of 45 degrees with an optical axis, configured to split the first light beam into a reflected light beam and a third pass through light beam, and capable of moving along the 45-degree direction to adjust different time proportions of the first light beam and the third light beam for color control;
- a phosphor device, placed in a third light beam path and configured to generate green light beam by exciting a green phosphor;
- a second phosphor device, placed in a second light beam path and configured to generate red light beam by exciting a red phosphor; and
- an optical filter group, placed in the light beam path, having a first optical filter which reflects green light beam and allows other light beams to pass through, and a second optical filter which reflects red light beam and allows other light beams to pass through, and configured to guide the light beam to an optical-illumination system.

6. The laser light source optical projection architecture of claim 5, wherein the phosphor device and the second phosphor device may be stationary or rotated in a free-run mode.

7. The laser light source optical projection architecture of claim 6, wherein the proportion of the reflective aluminum film to a transparent segment of the color control device is designed to vary from small to large at various radii using an irregular symmetrical pattern.

8. The laser light source optical projection architecture of claim 6, wherein the color control device is an actuator having a special segment thereof plated with a film sheet.

9. The laser light source optical projection architecture of claim 8, wherein the proportion of the reflective aluminum film segment to the transparent segment of the color control device is designed to vary from small to large, traversing the length of the device.

10. A laser light source optical projection architecture, comprising:
- a laser light source group, comprising a first laser light source and a second laser light source that are respectively configured to generate a first light and a second light;
- a color control device, being configured as a transparent/reflective wheel with a segment of the wheel plated with a reflective aluminum film, placed in a first light beam path and forming an angle of 45 degrees with an optical axis, configured to split the first light beam into a first reflected light beam and a third pass through light beam, and being capable of moving along the 45-degree direction to adjust different time proportions of the first light beam and the third light beam for color control;
- a phosphor device, placed in a third light beam path and configured to generate green light beam by exciting a green phosphor; and
- an optical filter group, placed in the light beam path, having a first optical filter which reflects green light beam and allows other light beams to pass through, and a second optical filter which reflects red light beam and allows other light beams to pass through, and configured to guide the light beam to the optical-illumination system.

11. The laser light source optical projection architecture of claim 10, wherein the phosphor device may be stationary or rotated in a free-run mode.

12. The laser light source optical projection architecture of claim 11, wherein the proportion of the reflective aluminum film to the transparent segment of the color control device, designed with an irregular asymmetrical pattern, varies from small to large at various radii.

13. The laser light source optical projection architecture of claim 11, wherein the color control device is an actuator having a special segment thereof plated with a film sheet.

14. The laser light source optical projection architecture of claim 13, wherein the proportion of the reflective aluminum film to the transparent segment of the color control device is designed to vary from small to large, traversing the length of the device.

15. A laser light source optical projection architecture, comprising:
- a blue laser light source, configured to generate a first light;
- a color control device, configured as a transparent/reflective wheel with a segment plated with a reflective aluminum film, placed in a first light beam path and forming an angle of 45 degrees with an optical axis, configured to split the first light beam into a first reflected light beam and a third pass through light beam, and capable of moving along the 45-degree direction to adjust different time proportions of the first light beam and the third light beam for color control;
- a phosphor device, placed in a second light beam path and configured to excite a yellow phosphor to generate yellow light beam comprising a composition of red light beam and green light beam and
- an optical filter group, placed in the light beam path, having a first optical filter and a third optical filter which reflects the green light beam and allow other light beams to pass through, a second optical filter which only reflects the red light beam and allows other light beams to pass through, and a fourth optical filter which only reflects the first light beam and allows other light beams to pass through, and configured to guide the light beam to the optical-illumination system.

16. The laser light source optical projection architecture of claim 15, wherein the phosphor device may be stationary or rotated in a free-run mode.

17. The laser light source optical projection architecture of claim 16, wherein the proportion of the reflective aluminum film segment to the transparent segment of the color control device, designed with an irregular asymmetrical pattern, varies from small to large at various radii.

18. The laser light source optical projection architecture of claim 16, wherein the color control device is an actuator having a special segment thereof plated with a film sheet.

19. The laser light source optical projection architecture of claim 18, wherein the proportion of the reflective aluminum film to the transparent segment of the color control device is designed to vary from small to large, traversing the length of the device.

20. The laser light source optical projection architecture of claim 17, comprising an electrically controlled light shutter group, which is placed in a path of green light beam and red light beam, and is capable of color control by adjusting the different time proportions of red light beam, green light beam and blue light beam through synchronous adjustment of the color control device and the electrically controlled light shutter group.

21. The laser light source optical projection architecture of claim 19, comprising an electrically controlled light shutter group, which is placed in a path of green light beam and red light beam, and is capable of color control by adjusting the different time proportions of red light beam, green light beam and blue light beam through synchronous adjustment of the color control device and the electrically controlled light shutter group.

* * * * *